United States Patent
Platter et al.

(10) Patent No.: US 10,887,366 B1
(45) Date of Patent: Jan. 5, 2021

(54) SYSTEMS, METHODS, AND STORAGE MEDIA FOR MANAGING ENCODER INSTANCES IN A SERVERLESS CONTENT DISTRIBUTION PLATFORM

(71) Applicant: CBS Interactive inc., San Francisco, CA (US)

(72) Inventors: Jeff Platter, San Francisco, CA (US); Taylor Busch, San Francisco, CA (US); Jijo Jose, San Francisco, CA (US); Krystal Mejia, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 0 days.

(21) Appl. No.: 16/504,530

(22) Filed: Jul. 8, 2019

(51) Int. Cl.
| | |
|---|---|
| *H04N 21/262* | (2011.01) |
| *H04N 21/23* | (2011.01) |
| *H04N 21/00* | (2011.01) |
| *H04L 29/06* | (2006.01) |

(52) U.S. Cl.
CPC .......... *H04L 65/607* (2013.01); *H04L 65/608* (2013.01); *H04N 21/26241* (2013.01)

(58) Field of Classification Search
CPC ... H04L 65/607; H04L 41/0859; H04L 67/34; H04L 67/02; H04L 67/36; H04L 65/608; H04L 2209/38; H04L 67/12; G06N 3/08; G06N 20/00; G06F 16/951
See application file for complete search history.

(56) References Cited

U.S. PATENT DOCUMENTS

| | | | |
|---|---|---|---|
| 2010/0235472 A1* | 9/2010 | Sood | H04L 67/06 709/219 |
| 2010/0235528 A1* | 9/2010 | Bocharov | H04L 65/4092 709/231 |
| 2011/0138169 A1* | 6/2011 | Michel | H04N 7/17318 713/150 |
| 2016/0349949 A1* | 12/2016 | Miller | H04N 21/23439 |
| 2018/0270301 A1* | 9/2018 | Zhang | G06F 9/4494 |
| 2019/0149859 A1* | 5/2019 | George | H04N 21/234309 725/148 |
| 2019/0364081 A1* | 11/2019 | Valenzuela | H04L 67/40 |

* cited by examiner

*Primary Examiner* — Clayton R Williams
*Assistant Examiner* — Christopher B Robinson
(74) *Attorney, Agent, or Firm* — Rimon PC; Marc Kaufman (57) ABSTRACT

Systems, methods, and storage media for managing encoder instances in a serverless content distribution platform are disclosed. Exemplary implementations may: receive channel information relating to content to be streamed over a networked content distribution platform; associate the channel information with an encoder function that specifies video packaging settings and bitrates to create a stateless event object; repeat the receiving step and the associating step to create multiple stateless event objects; each correspond to one or more channels of streaming content; combine the multiple stateless event objects into a state machine; monitor the state of the state machine; and apply at least one workflow based on the states to manage instances of encoders corresponding to the one or more channels of streaming content.

15 Claims, 7 Drawing Sheets

SYSTEMS, METHODS, AND STORAGE MEDIA FOR MANAGING ENCODER INSTANCES IN A SERVERLESS CONTENT DISTRIBUTION PLATFORM

FIELD OF THE DISCLOSURE

The present disclosure relates to systems, methods, and storage media for managing encoder instances in a serverless content distribution platform.

BACKGROUND

The streaming of digital video content has become ubiquitous. In 2020, the number of digital video viewers in the United States is projected to surpass 236 million. See Online video and streaming—Statistics & Facts, Published by J. Clement, Aug. 27, 2018 at https://www.statista.com/topics/1137/online-video/. In order to efficiently stream video, over the internet for example, video content must be encoded, i.e. converted to a format that is compressed. Therefore, each video must have an encoder instance that is set up for the format and other parameters of the video channel. The encoder instances are often created and deleted in a dynamic manner to allow flexible streaming of content.

Dynamic content stream encoding services are well known. For example, the AWS MediaLive™ encodes live video streams in real-time, taking a larger-sized live video source and compressing it into smaller versions for distribution to viewers. AWS Lambda™ is an event-driven, serverless computing platform that runs code in response to events and automatically manages the computing resources required by that code. AWS Lambda™ can be used to automatically provision back-end services, such as MediaLive™ encoders, and "spin down" such services when not in use, to save resources.

However, MediaLive™ events are asynchronous and the MediaLive™ API is limited to 5 transactions per second (TPS). This makes the management of a high number (for example thousands) of streaming events to be impractical if not impossible. Specifically, to monitor the state of a MediaLive™ encoder, the specific channel must be queried. There is no pragmatic way to monitor the status of multiple encoders simultaneously. This combined with the limit of 5 TPS renders it virtually impossible to manage a large number of encoders in a dynamic manner.

SUMMARY

One aspect of the present disclosure relates to a system configured for managing encoder instances in a serverless content distribution platform. The system may include one or more hardware processors configured by machine-readable instructions. The processor(s) may be configured to receive channel information relating to content to be streamed over a networked content distribution platform. The channel information may include a start time for a content streaming event. The processor(s) may be configured to associate the channel information with an encoder function that specifies video packaging settings and bitrates to create a stateless event object. The processor(s) may be configured to repeat the receiving step and the associating step to create multiple stateless event objects, wherein each event object corresponds to one or more channels of streaming content. The processor(s) may be configured to combine the multiple stateless event objects into a state machine. The processor(s) may be configured to monitor the state of the state machine. The processor(s) may be configured to apply at least one workflow based on the states to manage instances of encoders corresponding to the one or more channels of streaming content.

Another aspect of the present disclosure relates to a method for managing encoder instances in a serverless content distribution platform. The method may include receiving channel information relating to content to be streamed over a networked content distribution platform. The channel information may include a start time for a content streaming event. The method may include associating the channel information with an encoder function that specifies video packaging settings and bitrates to create a stateless event object. The method may include repeating the receiving step and the associating step to create multiple stateless event objects which each correspond to one or more channels of streaming content; The method may include combining the multiple stateless event objects into a state machine. The method may include monitoring the state of the state machine. The method may include applying at least one workflow based on the states to manage instances of encoders corresponding to the one or more channels of streaming content.

Yet another aspect of the present disclosure relates to a non-transient computer-readable storage medium having instructions embodied thereon, the instructions being executable by one or more processors to perform a method for managing encoder instances in a serverless content distribution platform. The method may include receiving channel information relating to content to be streamed over a networked content distribution platform. The channel information may include a start time for a content streaming event. The method may include associating the channel information with an encoder function that specifies video packaging settings and bitrates to create a stateless event object. The method may include repeating the receiving step and the associating step to create multiple stateless event objects which each correspond to one or more channels of streaming content; The method may include combining the multiple stateless event objects into a state machine. The method may include monitoring the state of the state machine. The method may include applying at least one workflow based on the states to manage instances of encoders corresponding to the one or more channels of streaming content.

These and other features, and characteristics of the present technology, as well as the methods of operation and functions of the related elements of structure and the combination of elements, will become more apparent upon consideration of the following description and the appended claims with reference to the accompanying drawings, all of which form a part of this specification, wherein like reference numerals designate corresponding parts in the various figures. It is to be expressly understood, however, that the drawings are for illustration and description only and are not intended as a definition of the limits of the invention. As used in the specification and in the claims, the singular form of "a", "an", and "the" include plural referents unless the context clearly dictates otherwise.

DETAILED DESCRIPTION

The disclosed implementations manage events, such as video content streaming events, that can be received from a client device via an API. Those events are stored and maintained in the system. When it is close to the start time of an event a video encoder is dynamically created, for example in the cloud utilizing the AWS Medialive™ encoding service. Clients can then stream their video into the encoders where the stream is transcoded into a format that can be distributed over a network, such as the internet. The system can authenticate the stream using authentication tokens and route the incoming stream to the dynamically created encoder. Once the event has ended the dynamic encoder can be deleted. A user interface can provide information of events in the system, such as details on the events for the current day and the state of the encoder infrastructure for each event. The interface can also provide detailed troubleshooting logs for each event as well as detailed information regarding the status and state of each event. A monitoring system can include a dynamic multi-viewer which can show and monitor the actual content streaming into and out of each event. The system dynamically adds events to the multi-viewer monitoring system when the dynamic encoder is created and removes the event from the monitoring system when the encoder is deleted. The system is scalable to handle thousands of events at a time.

Figure 1:
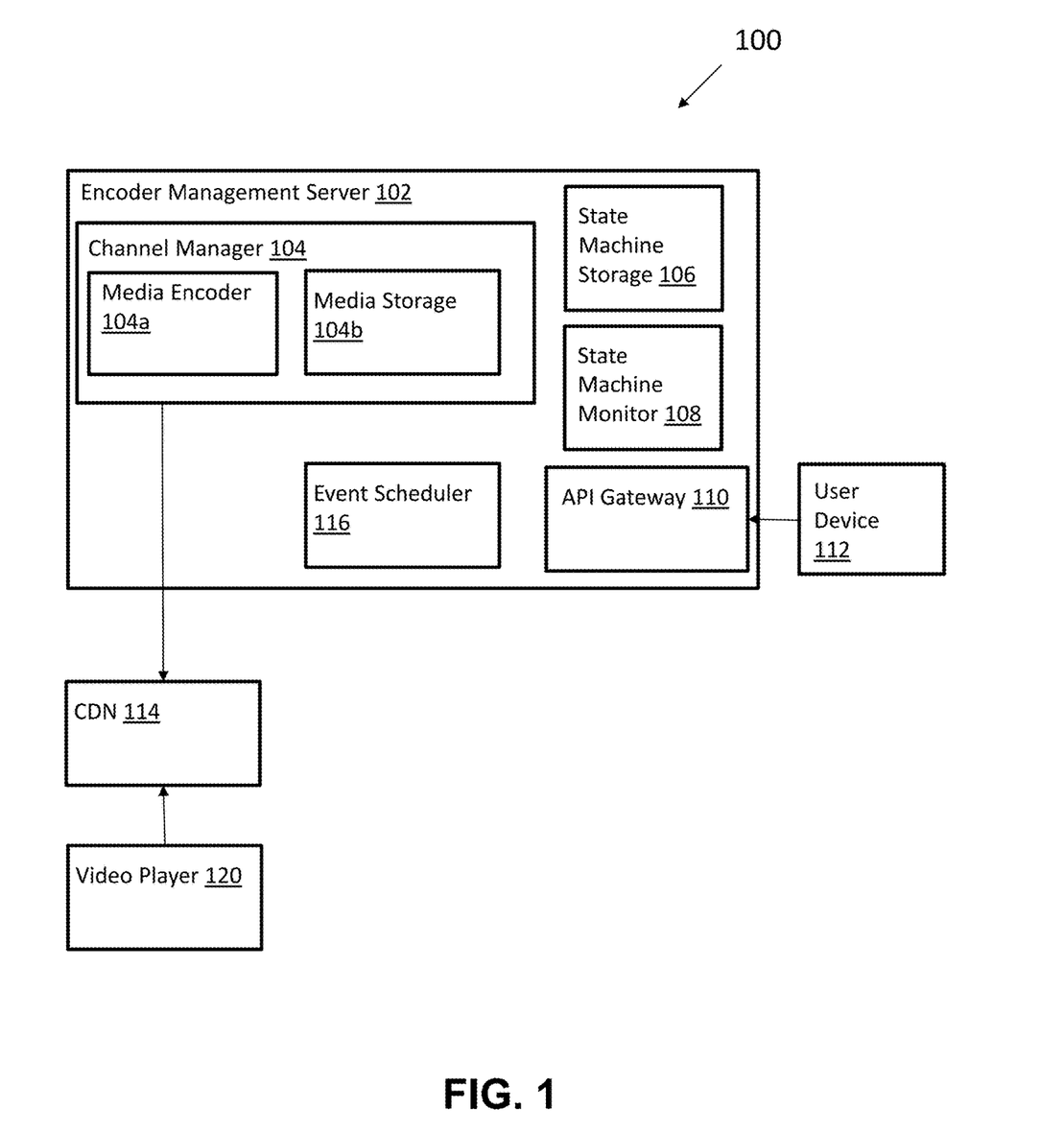
FIG. 1 illustrates a computer architecture in which implementations of a system for managing encoders may be used.

FIG. 1 illustrates computer architecture 100 in which implementations of a system for managing encoders may be used. Architecture 100 includes encoder management server 102 which in turn includes channel manager 104, state machine storage 106, state machine monitor 108, API gateway 110 and event scheduler 116. Channel manager 104 includes media encoder 104*a* and media storage 104*b*.

Channel manager 104 receives content and channel information relating to media to be streamed. The channel information can include timing information, format information, and other metadata relating to a video stream event. Media encoder 104*a* provides encoding of the content in accordance with the channel information in a known manner. For example, media encoder 104*a* could use the AWS MediaLive™ cloud-based video processing service which encodes live video streams in real-time, taking a larger-sized live video source and compressing it into smaller versions for distribution. Media storage 104*b* stores the encoded video and related information. For example, media storage 104*b* could use AWS MediaStore™, which provides a storage service optimized for media and can act as an origin store in the video workflow. It follows that, while channel manager 104 is shown as being physically part of encoder management server 102 in FIG. 1, various components can reside at remote locations and/or can be provided by cloud services or other distributed architectures. Each event can be stored as an event object, such as an AWS Lambda™ object, as described in greater detail below.

State machine storage 106 stores state machine logic that includes multiple event objects which each represent one or more channels of streaming content. The state machine logic and event objects are described in greater detail below. The state machine logic can be in the form of AWS Step Functions™. State machine monitor 108 monitors the various states of the stored state machine(s) in the manner described below. API Gateway 110 provides an interface for external devices, such as user device 112, a client device, to interact with encoder management server 102 for various tasks, such as manual control of services. Event scheduler 116 schedules various tasks in accordance with the state of the state machine and the information in the event objects. Content Distribution Network (CDN) 114 receives the content and related data at the specified time for distribution, in a known manner, to video player 120, which can be a user device.

Figure 2:
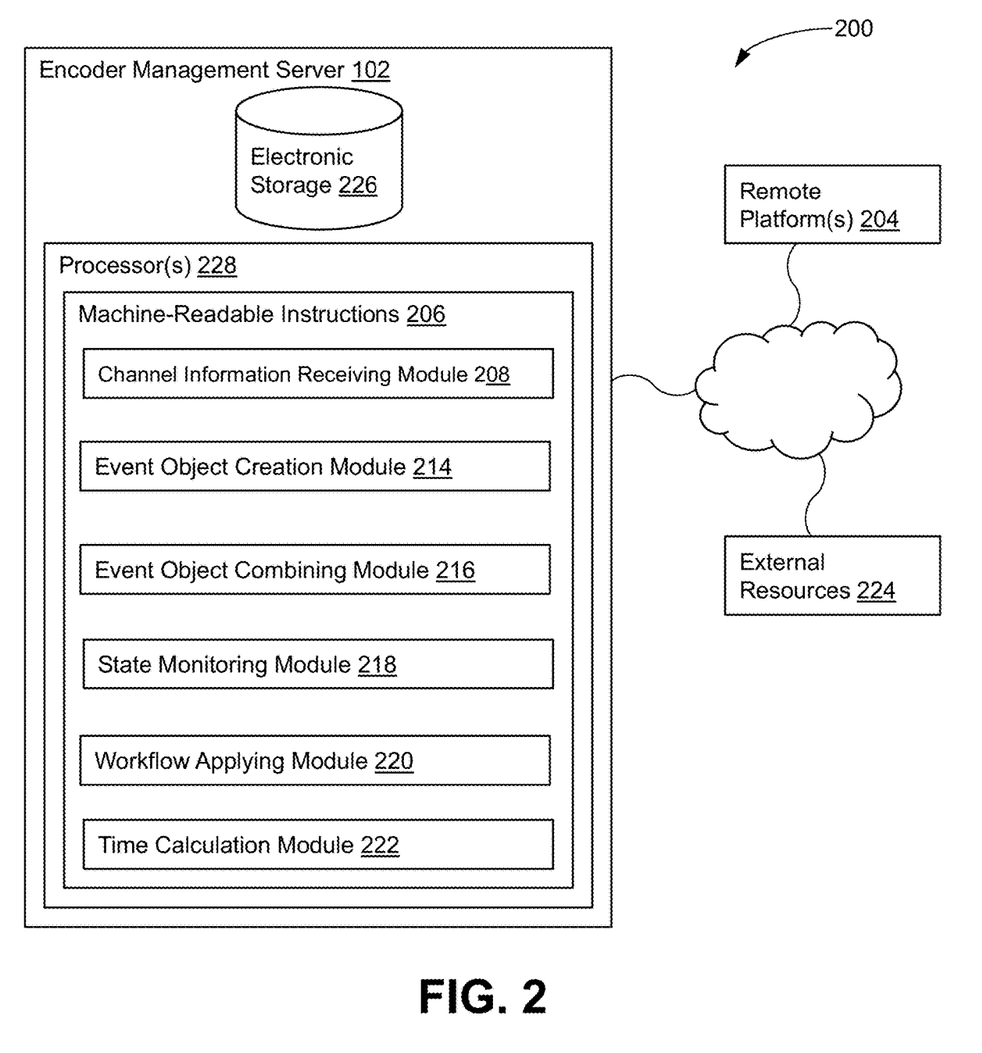
FIG. 2 illustrates a system configured for managing encoder instances in a serverless content distribution platform, in accordance with one or more implementations.

FIG. 2 illustrates a system 200 showing the logic modules of encoder management server 102 for managing encoder instances in a serverless content distribution platform, in accordance with one or more implementations. In some implementations, system 200 may include one or more servers 102. Server(s) 102 may be configured to communicate with one or more client computing platforms 204, such as user device 112 and CDN 114 of FIG. 1, according to a client/server architecture and/or other architectures. Client computing platform(s) 204 may be configured to communicate with other client computing platforms via server(s) and/or according to a peer-to-peer architecture and/or other architectures. Further, various external resources, 224 may communicate with Encoder management server.

Encoder Management server 102 may be configured by machine-readable instructions 206 which are executed by processors 228. Machine-readable instructions 206 may include one or more instruction modules. The instruction modules may include computer program modules. The instruction modules may include one or more of channel information receiving module 208, event object creation module 214 event object combining module 216, state monitoring module 118, workflow applying module 220, time calculation module 222, and/or other instruction modules.

Channel information receiving module 208 may be configured to receive channel information relating to content to be streamed over a networked content distribution platform. The content information may include a start time for a content streaming event. Event object creation Module 214 may be configured to associate the channel information with an encoder function that specifies video packaging settings and bitrates to create a stateless event object. The functions of modules 208 and 214 may be configured to repeat to create multiple stateless event objects. Event object combining module 216 may be configured to combine the multiple stateless event objects into a state machine. The stateless event objects may be AWS Lambda™ objects and the state machine can be one or more AWS Step Functions™.

State monitoring module 218 may be part of state machine monitor 108 and may be configured to monitor the state of the state machine(s). The monitoring may include periodically checking the status of the state machine to detect events that are scheduled to run in a predetermined time window. Workflow applying module 220 may be configured to apply at least one workflow based on the states to manage instances of encoders corresponding to the one or more channels of streaming content. Workflows are discussed in greater detail below.

Time calculation module 222 may be part of event scheduler 116 and may be configured to calculate an optimal time to instantiate encoders for events. The calculating may be based on the number of events scheduled to run in the predetermined time window. The calculating may be based on a preconfigured early start time for each event scheduled to run in the predetermined time window. The calculating may be based on a predetermined time buffer configured to allow multiple attempts at starting the encoders.

In some implementations, by way of non-limiting example, the event object may include a data structure that includes fields for at least one of a channel ID, a connection state, content type, a start time, an end time, an event status, and a cryptographic key. In some implementations, by way of non-limiting example, the workflows may include at least one of create channel workflow, an edit channel workflow, a delete channel workflow, and a restart channel workflow, all of which are described in detail below through examples.

The various computing devices may be operatively linked via one or more electronic communication links. For example, such electronic communication links may be established, at least in part, via a network such as the Internet and/or other networks. A given computing device may include one or more processors configured to execute computer program modules. The computer program modules may be configured to enable an expert or user associated with the given client computing platform 204 to interface with system 200 and/or external resources 224, and/or provide other functionality attributed herein to computing devices. By way of non-limiting example, the remote platforms 204 may include one or more of a desktop computer, a laptop computer, a handheld computer, a tablet computing platform, a Smartphone, a gaming console, and/or other computing platforms.

External resources 224 may include sources of information and/or services outside of system 200, external entities participating with system 200, and/or other resources. Electronic storage 226 may comprise non-transitory storage media that electronically stores information. The electronic storage media of electronic storage 126 may include one or both of system storage that is provided integrally and/or removable storage that is removably connectable to encoder management server 102 via, for example, a port (e.g., a USB port, a firewire port, etc.) or a drive (e.g., a disk drive, etc.). Electronic storage 226 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 226 may store software algorithms, information determined by processor(s) 228, information received from computing devices and/or other information that enables encoder management server 102 to function as described herein.

Processor(s) 228 may be configured to provide information processing capabilities. As such, processor(s) 228 may include one or more of a digital processor, an analog processor, a digital circuit designed to process information, an analog circuit designed to process information, a state machine, and/or other mechanisms for electronically processing information. Although processor(s) 228 is shown in FIG. 2 as a single entity, this is for illustrative purposes only. In some implementations, processor(s) 128 may include a plurality of processing units. These processing units may be physically located within the same device, or processor(s) 228 may represent processing functionality of a plurality of devices operating in coordination. Processor(s) 228 may be configured to execute the described modules and/or other modules. Processor(s) 128 may be configured to execute the modules by software; hardware; firmware; some combination of software, hardware, and/or firmware; and/or other mechanisms for configuring processing capabilities on processor(s) 228. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules are illustrated in FIG. 2 as being implemented within a single processing unit, in implementations in which processor(s) 228 includes multiple processing units, one or more of the modules may be implemented remotely from the other modules. The description of the functionality provided by the different modules described below is for illustrative purposes, and is not intended to be limiting, as any of the modules may provide more or less functionality than is described.

Figure 3:
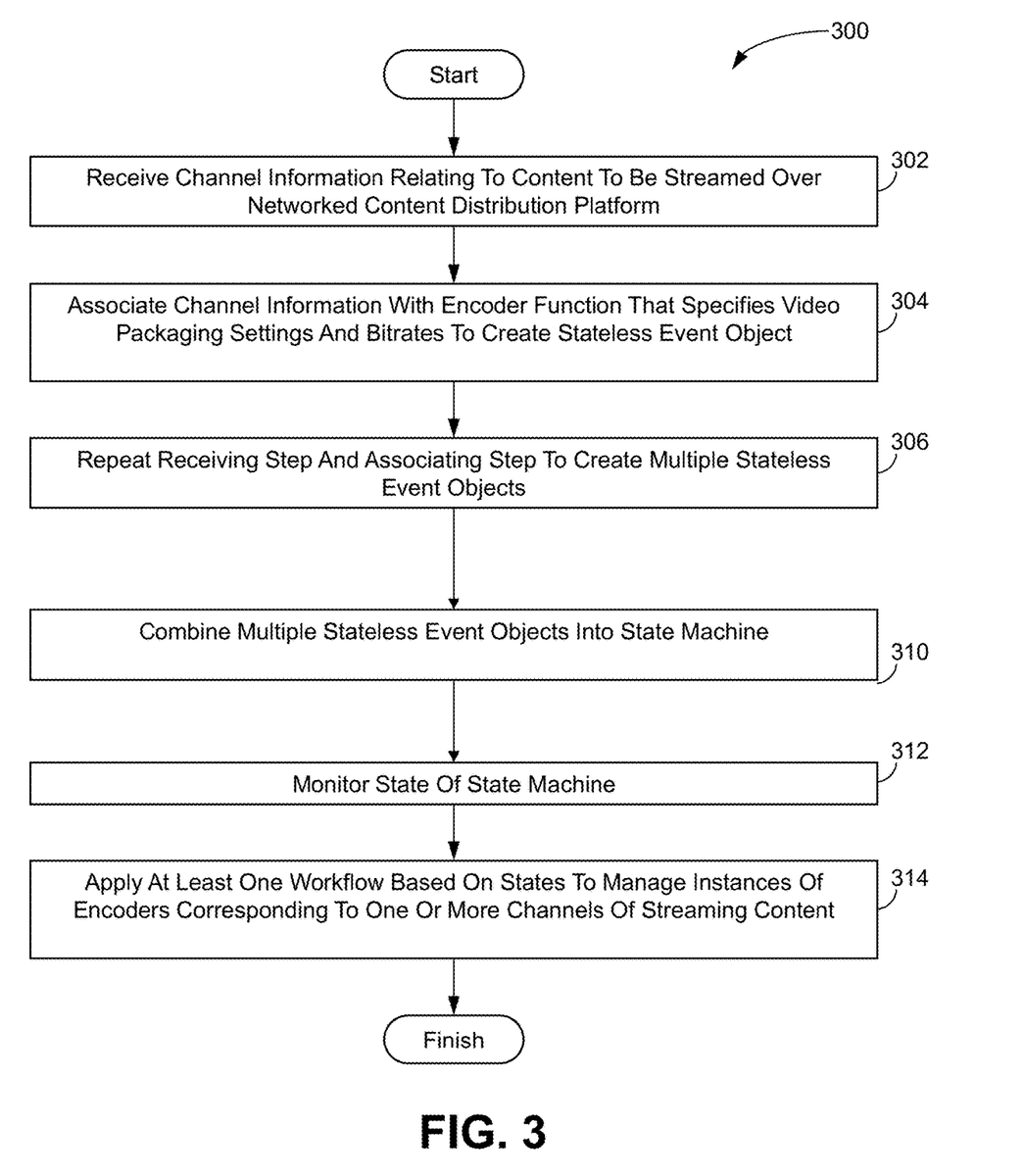
FIG. 3 illustrates a method for managing encoder instances in a serverless content distribution platform, in accordance with one or more implementations.

FIG. 3 illustrates a method 300 for managing encoder instances in a serverless content distribution platform, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include receiving channel information relating to content to be streamed over a networked content distribution platform. The channel information may include a start time for a content streaming event. Operation 302 may be performed by one or more hardware processors configured by machine-readable instructions including a module that is the same as or similar to channel information receiving module 208, in accordance with one or more implementations.

An operation 304 may include associating the channel information with an encoder function that specifies video packaging settings and bitrates to create a stateless event object. Operation 304 may be performed by one or more hardware processors configured by machine-readable instructions including a module that is the same as or similar to event object creation module 214, in accordance with one or more implementations.

An operation 306 may include repeating the receiving step and the associating step to create multiple stateless event objects. Operation 306 may be performed by one or more hardware processors configured by machine-readable instructions, in accordance with one or more implementations.

An operation 310 may include combining the multiple stateless event objects into a state machine. Operation 310 may be performed by one or more hardware processors configured by machine-readable instructions including a module that is the same as or similar to event object combining module 216, in accordance with one or more implementations.

An operation 312 may include monitoring the state of the state machine. Operation 312 may be performed by one or more hardware processors configured by machine-readable instructions including a module that is the same as or similar to state monitoring module 218, in accordance with one or more implementations.

An operation 314 may include applying at least one workflow based on the states to manage instances of encoders corresponding to the one or more channels of streaming content. Operation 314 may be performed by one or more hardware processors configured by machine-readable instructions including a module that is the same as or similar to workflow applying module 220, in accordance with one or more implementations The event objects will now be described in greater detail. There can be several different classifications for event objects:

Encoder events (the default)
Passthrough events
Test events
Video events
Audio events All of these events can be streamed encoded events. A video event, of course, has video to stream along with an accompanying audio track. In contrast an audio event has no actual video track to it. An event object is defined by a data structure. An example of a typical event object data structure is set forth below.

```
{
    "channelid": "8017460",
    "connectionstate": "disconnected",
    "contenttype": "audio",
    "datetimecreated": 1556148115,
    "datetimeupdated": 1556148115,
    "endtime": 1556148382,
    "endtimeutc": 1556146800,
    "environment": "cms.cbsiadvancedmedia.com",
    "eventinstructions": "instructions",
    "eventstate": "ended",
    "eventstatus": "live",
    "eventtitle": "Iowa v Nebraska",
    "eventtype": "game",
    "ingest": {
        "primary": {
            "key": "25a9949f10c1b4b",
            "pub_point": "iowa_audiosoftball",
            "url":
"rtmp://ingest.sidearmstreaming.com:1935/live/
    iowa_audiosoftball?key=25a9949f 10c1b4b"
        }
    },
    "is_passthrough": false,
    "istest": false,
    "path": "20190424/iowa/w-softbl/02bc1266-05cf-455c-
        9daf-9fac27d510ab",
    "playbackUrl": "https://cbssidearmlive.akamaized.net/
        live-e/20190424/iowa/w-softbl/02bc1266-05cf-455c-
        9daf-9fac27d510ab/m aster. m3u8",
    "prismid": "02bc1266-05cf-455c-9daf-9fac27d510ab",
    "region": "live-e",
    "related_tags": {
        "25802-1507041902": "Entitlement:SportsLive:College Sports Live Monthly",
        "25802-1507041903": "Entitlement:SportsLive:College Sports Live Annual"
    },
    "retry": 1,
    "schedule": {
        "endtimestamp": 1556148382,
        "starttimebuffer": 0,
        "starttimestamp": 1556139000
    },
    "school": "iowa",
    "school_name": "University of Iowa",
    "source_id": "1dab7797-1970-43f9-bbeb-9bd9bb8a36fd",
    "source_name": "SideArm",
    "sport": "w-softbl",
    "sport_name": "Softball",
    "starttime": 1556139000,
    "starttimeutc": 1556139000,
    "timestamp": 1556148382,
    "transcodeprofile": {
        "id": null,
        "name": "name"
    },
    "venue": "venue",
    "video_status": "LIVE"
}
```

Any event with a type of "encoder", i.e. an encoder event, can be processed by the encoder management system for dynamic encoding and content acquisition. The is_passthrough parameter will configure an event as a passthrough event. A passthrough event is encoded by a 3rd party and only entered into the system for playback monitoring. Events marked with the istest parameter will be treated differently by the frontend player as well as the channel cleaner process (described below) at the end of the event lifecycle.

The ingest data structure defines the publish point the client will send their stream into for encoding. This is the static entry point assigned to every event processed by the encoding backend system. Publish points are unique to events and times. If two events overlap slightly in time and are configured to use the same publish points then the second event will be set to a conflict state and not be allowed to start up backend infrastructure until the first event has been ended and the conflict can be cleared. This is managed by workflows as described in more detail below.

Event scheduler 116 (FIG. 1) coordinates scheduling of events. As an example, event scheduler 116 can be configured to run every minute and look for events that are scheduled to run within the next hour, or any other appropriate time period. Event scheduler 116 can calculate the optimal time to spin up the backend encoders for the event based on, for example, several factors:

a. How many events are scheduled to start at that exact time?
b. What is the preconfigured early start time for that event based on the customer agreement we have?
c. An extra 10 minute buffer to accounting for between 2-3 failed attempts at starting the backend encoders.

For cost efficiency it is desirable to start up the backend encoders as close to the stream beginning time as practical. To maximize resources of the underlying infrastructure with requests to startup multiple encoders at the same time during busy times, a delay, 5 seconds for example, can be inserted into every request for starting an encoder creation process. Under this example, up to 12 events per minute can be started. Event scheduler 116 can uses the following formula to calculate when to start up events.

(Math.ceil(*n*/12)*60)+(prestart buffer)+600

Event scheduler 116 will then send those events to the channel manager 104, which will extract the metadata of the event and use the Create Channel workflow described below to create the encoder/channel.

An Encoder Management User Interface (EMUI) can be provided on user device 112 to provide the flexibility to manually control an events encoder. A user can Create, End/Delete, Edit, and Restart events. Functionality can be restricted based on the current state of the event (e.g, Scheduled, Conflict, Running, Ended etc.). These controls will communicate directly with the channel manager 104 by leveraging API Gateway 110 to handle the incoming requests.

Figure 4:
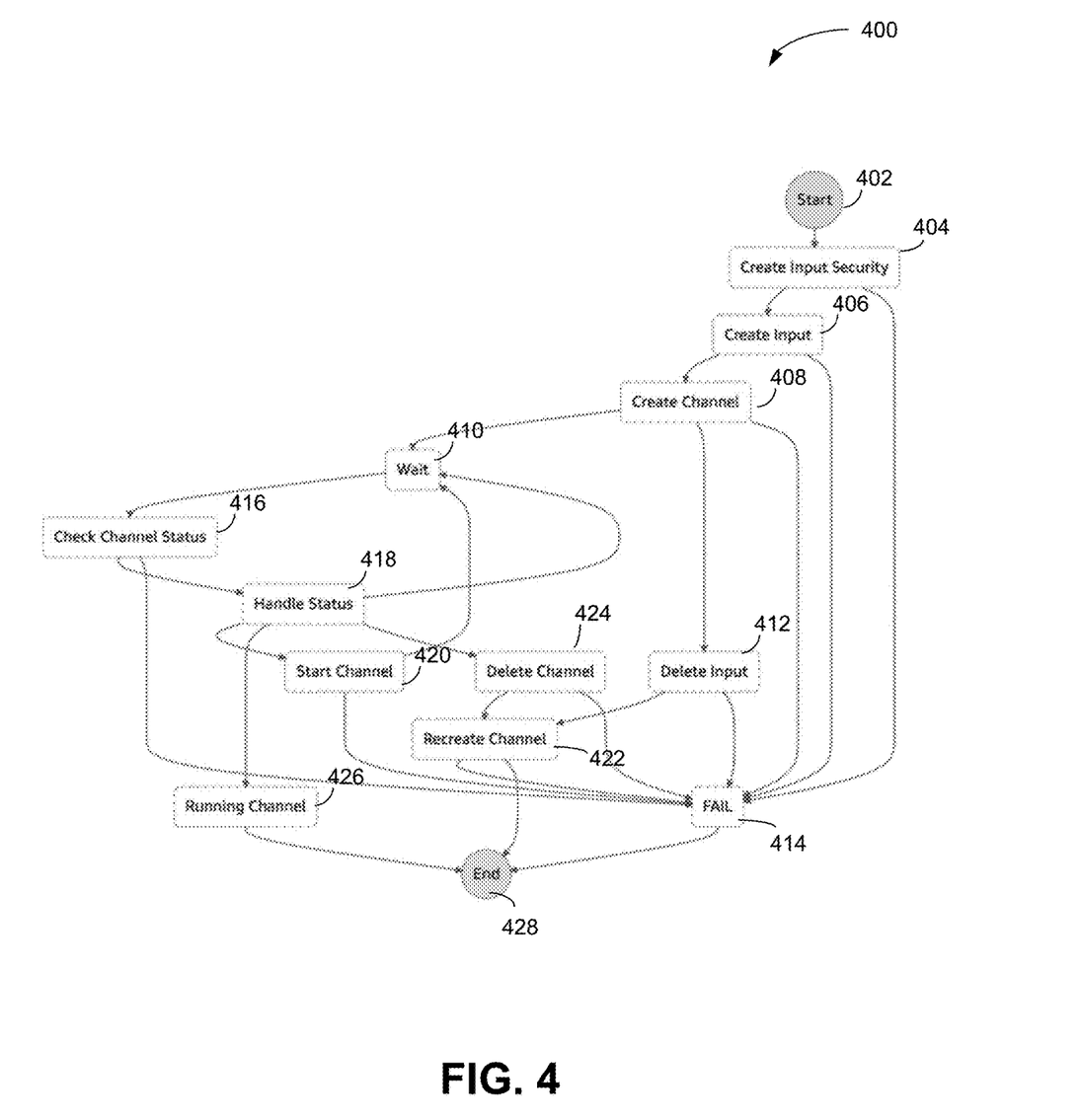
FIG. 4 is a flowchart illustrating a state machine Create Channel workflow.

To maximize resources, it is desirable to dynamically manage hundreds, or event thousands, of encoders at any given time. For example, the MediaLive™ service does not handle large amounts of transactions well because MediaLive™ events are asynchronous and the MediaLive API has a limit of 5 transactions per second. By creating the above-noted state machines, each node in the state machine can be forced to await completion of each event and each node can be monitored for any failures. If an individual node fails, the entire state machine fails. Further, incoming requests can be throttled by limiting the number of state machines that are run in parallel, rather than manage all of the objects for example. Examples of the state machines are described below. In the examples, the state machines can be created by leveraging AWS Step Functions™. In the examples below, each node can be an AWS Lambda™ function that can interface with the MediaLive™ API FIG. 4 illustrates a workflow chart 400 of a Create Channel state machine. The workflow starts at 402 and continues to node 404 Create Input Security which creates the input security group (a software defined firewall) which allows encoding traffic to reach the channel manager 104 for encoding. The workflow then proceeds to node 406 Create Input at which the actual channel input is created with a dynamic public IP address and a specific destination which is specified by the event metadata (the channel data). If the channel input creation step 406 fails, the workflow proceeds to node 414 FAIL. After channel input creation step 406 the workflow proceeds to step 408 Channel Creation. This step actually creates the dynamic encoder. Next, at step 410 there is awaiting timeout set to allow the encoder to be created. For example, the timeout time can be 30 seconds. If the channel creation failed, then it will send the flow to node 412 delete Channel Input and then goes to node 422 recreate channel to reset the event status back to Scheduled and increment a retry flag on the event after which the process will move on to node 414 FAIL to thereby clean up what it has done already so that it can start the process over again. By setting the event back to scheduled it will be picked up by the scheduler the next time the scheduler executes. If the total number of retries is within the configured limits the channel creation process will be started all over again. After the set time is reached, the workflow proceeds to node 416 Check Channel Status at which the status of the channel is checked, and the process is routed based on the status via node 418. Once step 418 has finally validated that the channel has been successfully created it proceeds to step 420 Start Channel. This is equivalent to turning the new encoder cony. After the command is given to Start, the channel the workflow moves back to step 410 and waits for 30 seconds while the encoder is started up. The same circular pattern is repeated as was done with channel creation where step 416 will check the status of the channel and pass that status to step 418 to handle that status. If the status of the channel is returned as 'running', flow proceeds to node 426 Running Channel to update the proper status of the channel to notify the rest of the system that the channel is now in a running state. If the channel status is still 'starting', it will go back to step 410 and try again in 30 seconds. If the status is some sort of error state, the process will move to step 424 Delete Channel. This will delete the channel that was created, then move on to step 422 which will reset the state back to scheduled and the retry flag set so that the scheduler can try again. Lastly there is an overall timeout of 7 minutes on this entire workflow. If the timeout is reached then the entire process will just stop where it is and automatically move to the FAIL step. If the channel is running, flow proceeds to node 426 Running Channel to update the proper status of the channel to notify the rest of the system that the channel is now in a running state.

Figure 5:
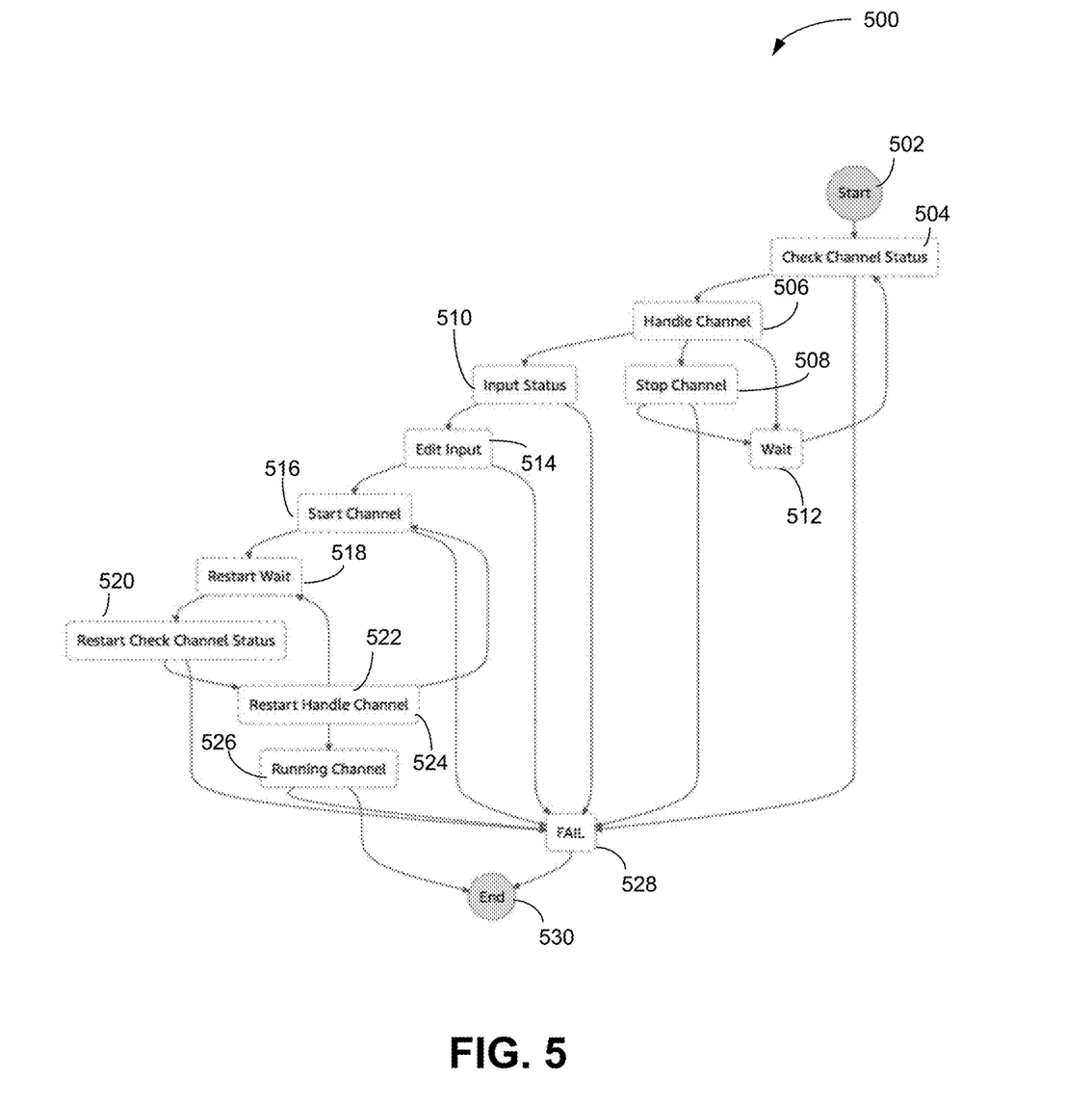
FIG. 5 is a flowchart illustrating a state machine Edit Channel workflow.

FIG. 5 illustrates a workflow chart 500 of an Edit Channel state machine. The workflow begins at 502 and at 504 the channel state is checked by querying the channel that was just requested to be created using the specific channel ID. The current status of that channel will be passed back to the step function and passed onto the next step. At 506, the workflow is routed appropriately based on that status. A running channel ordinarily cannot be edited and so to edit the type of event and change it from and Audio Only event to a full Video event or vice versa then the channel must be stopped, the configuration must be edited and then the new appropriate channel input must be created and attached to the channel. Therefore, if the channel is running then it will be routed to 508 to trigger a channel stop command. The system will wait, for 30 seconds for example, for the channel to stop running and then at 506 it will check the status again. If the state of the channel is set back to an idle state the flow moves on to 510 to check the type of input (e.g. is it an Audio type input or a Video type input) . . . . If the channel has not finished creating, then the workflow will go to the Wait step at 512. If the channel has successfully completed creating, then the workflow will go to 510, at which the status of the channel input is checked (e.g. is it an Audio type input or a Video type input), or 508.

At 514, the type of input that is attached to the channel is modified. For example, an Audio RTP input can be changed to a Video RTMP input or a Video RTMP input to an Audio RTP input. At 516, the idle channel is started to run. The workflow will go back into a Wait process at 518 to wait until this has been completed since this process can take up to several minutes. At 520, the status of the channel is queried using the specific channel ID. The current status of that channel will be passed back to the workflow and passed onto the next step. At 522, if the channel is not running then the workflow will return to start channel at 516. If the channel is running, then the workflow goes on to 526 and ends at 530. At any point of the workflow, an unexpected state can cause the workflow to fail at 528.

Figure 6:
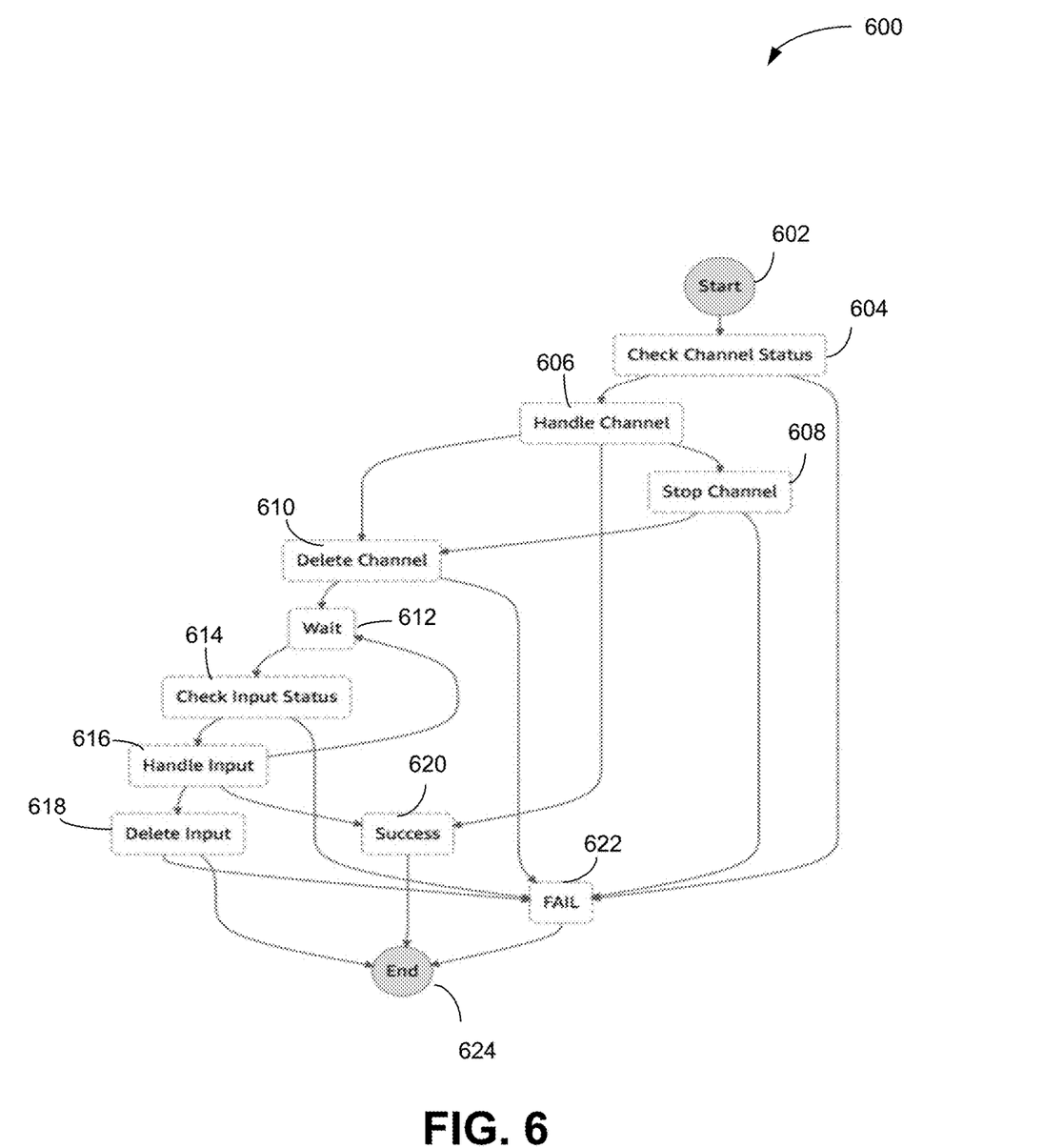
FIG. 6 is a flowchart illustrating a state machine Delete Channel workflow.

FIG. 6 illustrates a workflow chart 600 of a Delete Channel state machine. The workflow starts at 602 and checks channel status, similar to the manner described above, at 604. At 606, the workflow is routed appropriately based on that status. If the channel is running, then the workflow will proceed to 608 at which the channel is stopped. and then to 610 at which the channel is deleted. Otherwise, the process will proceed directly from 606 to 608. At 612, the workflow enters a Wait state to allow time for deletion of the channel. At 614 A status query is made using the specific channel ID. The current status of that channel will be passed back to the next step 616 at which the workflow is routed based on the status returned as a result of the query. If the channel deletion was successful, the process ends at 624, otherwise it fails at 622.

Figure 7:
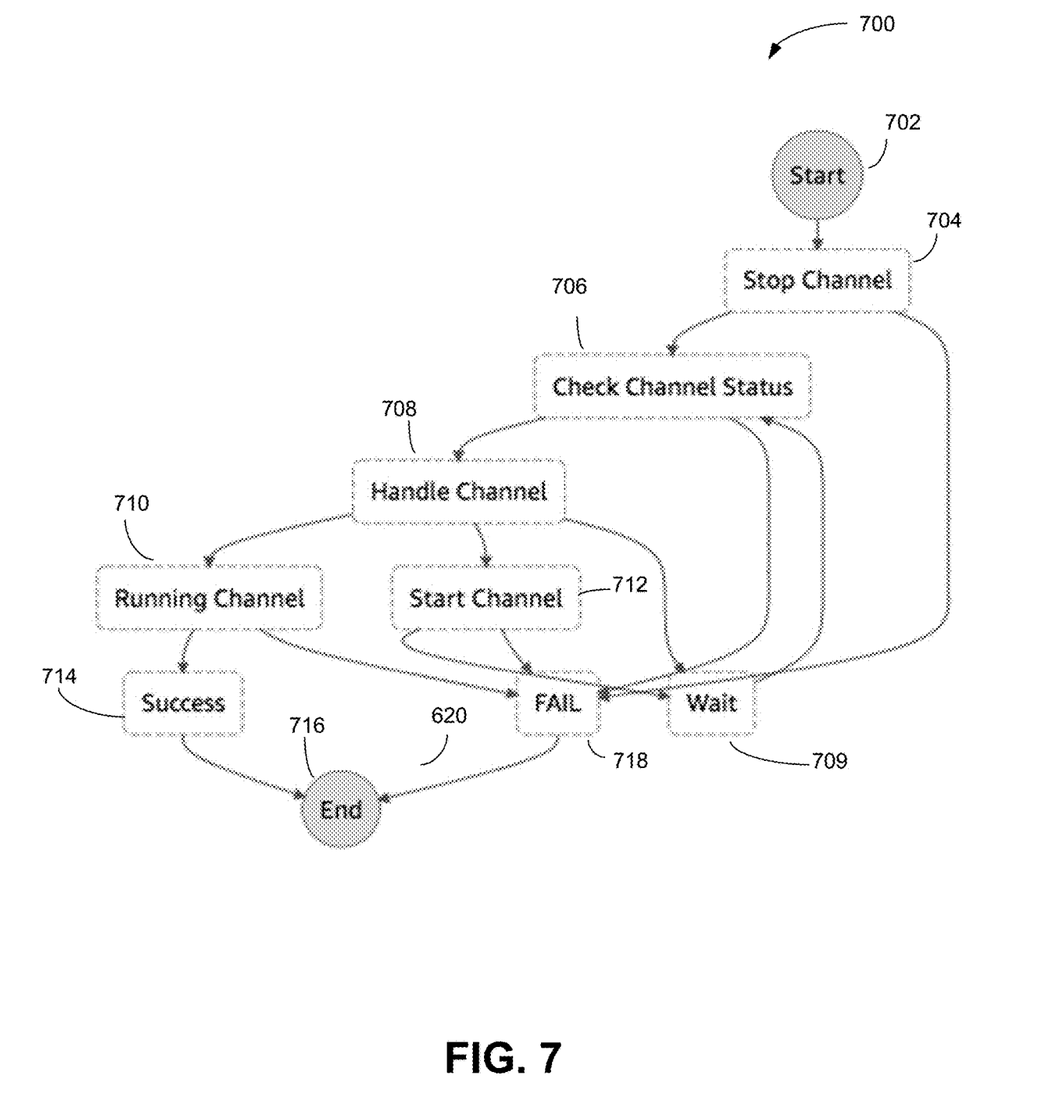
FIG. 7 is a flowchart illustrating a state machine Stop Channel workflow.

FIG. 7 illustrates a workflow chart 700 of a Restart Channel state machine. The workflow starts at 702 and continues to 704 the selected channel is set back to an idle state. This process can take up to several minutes to complete and so this sets the workflow into a Wait polling pattern at 709. When the channel has been stopped (set to idle) the workflow proceeds to 706 to check the status of the channel and route the workflow appropriately, at 708, based on that status. If the channel is status is Idle, the channel will be restarted at 712. If the channel status is Running, a data table, (e.g. the DynamoDB table) is updated with the proper status of the channel to notify the rest of the system that the channel is now in a running state at 714 and the workflow ends at 716. If the Channel is not running, the workflow fails at 718.

State machine monitor 108 (FIG. 1) ensures that the encoder/channels are created, edited, stopped, and the like. State machine monitor 108 analyzes the state machines, checking for failure and timeouts. State machine monitor 108 can execute periodically, such as once every minute. The default timeout of the Create Channel function can be, for example, five minutes. The average time it takes for the Create Channel function to create all necessary infrastructure for the encoder and set the channel to a running state is approximately 2 minutes 30 seconds. If after five minutes the function has not completed itself then it will timeout. State machine monitor 108 will look for any step function that has failed and during its next execution will reset the event to a scheduled state. This will allow event scheduler 116 to pick the event back up during its next execution and start the process over again. The retry parameter in the event object shown above stores the number of times the system has attempted to start this event. After a preconfigured number of retries the state machine monitor 108 will send an alert indicating that there is a problem with the event.

After a channel is running the channel creation process inserts a record into another table called "inputdetails." A record in this table looks as follows:

"destination": "rtmp://35.153.87.13:1935/CBS 1/primary",
"md5destination":
"492585aa79cb50649bf4027699ca178b",
"prismid": "e298410a-c563-4121-b056-098c78255b74",
"pubpoint": "CBS_1",
"type": "video"
}

Once the record is inserted into inputdetails the event can be configured for stream level monitoring in a third party multiview monitoring system. An API call is made with all of the streaming details of the event into the multiviewer monitoring system such as start time and end time of the event as well as playback URLs for monitoring.

The event object in the events table is updated to an eventstate of running which is reflected in the UI. The record in inputdetails is used by the proxies to map the incoming stream on its unique publishing point to the dynamic encoder that has just been created for that particular event. There is a DNS record assigned to the proxy layer. When a stream comes in to the proxy there is an access_token passed as a query param with that stream. The proxy first validates that the access_token is valid. If that is not successful then the proxy will immediately disconnect the stream with a permission denied error. If the token is validated successfully then the proxy makes a call into the inputdetails table in the database to look up the IP address of the encoder assigned to this event. The proxy then probes the stream for audio and video quality. If the event is configured to be a video event the proxy will continue to probe the stream several times until it detects a video signal. If the video signal is not detected within 30 seconds of initial connection, then the stream will be disconnected with an error. Once the stream health has been properly detected then the proxy will forward the stream on to the dynamic encoder. The proxy sends several logs back into a table for tracking logs so that the UI is able to display the progress of the connection. Once the connection is established the proxy updates the event in the events table to streaming which is reflected in the UI.

The monitoring system can detect the health of the outgoing stream based on the encoder. For example, it can detect if there is no audio or video present in the output. The system sends alerts to the encoder management server 102 (FIG. 1) when these states are detected. The encoder management server 102 is able to take this information and based on several factors make a decision on what to do with it. For example, the following logic can be applied by encoder management server 102 to process alerts.

In the use case where the event has not reached its start time yet then the alert is ignored.

In the use case where the event has passed its start time but has not reached its end time, the state is live, an alert will be sent that audio or video has not being received and the eventstatus of the event is updated to Not Yet Connected.

In the use case where the event has passed its start time but has not reached its end time, the state is live, and the alert clear. and the status of the eventstate in the event table to will be updated to Streaming (healthy).

In the use case where the event has passed its end time, then the status of the event is set to Disconnected.

There is also an event end monitor in state machine monitor 106 which runs every minute. It checks events that are in a running state to find if they have passed their configured end time. An example of the logic of event end monitor is follows.

If an event is marked as a test event and is 10 minutes passed its end time, the monitor will call the end event function. This will mark the event as ended and remove the backend encoder.

If an event is marked as passthrough it will update the eventstatus to ended in the events table.

If an event is set to go through our backend encoders then check the eventstatus:
  a. If eventstatus is Connected, send out an alert indicating that the event has passed its scheduled end time and is still steaming
  b. If eventstatus is Disconnected for more than a preconfigured amount of time, for example 5 minutes, then automatically mark the event as ended and remove the backend encoder.

c. If the eventstatus is Not Yet connected, then mark the event as ended immediately and remove the backend encoder.

It can be seen that creating the state machines allows channels to be monitored in a more efficient manner. This allows a more efficient control of the channels and large scale dynamic management of encoders thus overcoming many of the resource restrictions of known systems. The workflows described above are created from logic elements. Examples of the logic elements are described below.

Create Input Security: This creates the input security group (software defined firewall) which allows encoding traffic to reach the MediaLive channel for encoding.

Create Input: This creates the actual channel input with a dynamic public IP address and a specific destination which is specified by the event metadata.

Create Channel: This creates the actual MediaLive channel itself. The input security group is attached to the input which is then attached to the newly created channel. These three pieces of infrastructure combine together to make up the entire MediaLive dynamic encoder. This will send the step function into a Wait polling process while this task is processing as this may take up to several minutes to complete.

Wait/Restart Wait: This is a built in function of Step Functions. A 30 sec timeout is set at this stage and after that 30 sec timeout is reached the Step Function will go on to the next step.

Check Channel Status/Restart Check Channel Status: This will query the single MediaLive channel that was just requested to be created using the specific channel ID. The current status of that channel will be passed back to the step function and passed onto the next step.

Handle Status/Handle Channel: This checks the status of the channel and will route the step function appropriately based on that status. If the channel has not finished creating yet then the check will send the step function back into the Wait step. If the channel has successfully completed creating then it will send the function onto the next step in the process. If the channel creation failed then it will send the step function down a path to clean up what it has done already so that it can start the process over again.

Start Channel: This will take the idle channel that was just created and start it running. The step function will go back into a Wait process to wait until this has been completed since this process can take up to several minutes.

Running Channel: This updates the DynamoDB table with the proper status of the channel to notify the rest of the system that the channel is now in a running state.

Delete Channel: This will start the deletion process of an idle channel. This is called in the event Handle Status returns any form of error of the channel or during the channel deletion process when an event has ended properly..

Delete Input: This will remove the input that was created for this channel.

Recreate Channel: This will reset the event status in DynamoDB back to Scheduled and it will increment a retry flag on the event. By setting the event back to scheduled it will be picked up by the scheduler the next time the scheduler executes. If the total number of retries is within the configured limits the channel creation process will be started all over again.

Stop Channel: This sets a running channel back to an idle state so that it can be either edited or deleted. This process can take up to several minutes to complete and so this sets the step function back into a Wait polling pattern.

Input Status: This checks the status of the channel input. It is checking for an Audio type input or a Video type input.

Edit Input: This modifies the type of input that is attached to the channel. It can change an Audio RTP input to a Video RTMP input or a Video RTMP input to an Audio RTP input.

Fail: This marks the step function status as failed and sends an alert out notifying that the channel creation process failed and how many attempts it has been.

End: A built in step function method which signifies the end of the step function.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for managing encoder instances in a serverless content distribution platform, the system comprising:
one or more hardware processors configured by machine-readable instructions to:
receive channel information relating to content to be streamed over a networked content distribution platform, the channel information including a start time for a content streaming event;
associate the channel information with an encoder function that specifies video packaging settings and bitrates to create a stateless event object;
repeat the receiving step and the associating step to create multiple stateless event objects, each event object corresponding to one or more channels of streaming content; combine the multiple stateless event objects into a state machine;
monitor the state of the state machine; and
apply at least one workflow based on the states to manage instances of encoders corresponding to the one or more channels of streaming content; and
calculate an optimal time to instantiate encoders for events based on at least one of the number of events scheduled to run in the predetermined time window, a preconfigured early start time for each event scheduled to run in the predetermined time window, and a predetermined time buffer configured to allow multiple attempts at starting the encoders.

2. The system of claim 1, wherein the event object comprises a data structure that includes fields for at least one of a channel ID, a connection state, content type, a start time, an end time, an event status, and a cryptographic key.

3. The system of claim 1, wherein the workflows include at least one of create channel workflow, an edit channel workflow, a delete channel workflow, and a restart channel workflow.

4. The system of claim 1, wherein the stateless event objects are AWS Lambda™ objects and the state machine is one or more AWS Step Functions™.

5. The system of claim 1, wherein the monitoring comprises periodically checking the status of the state machine to detect events that are scheduled to run in a predetermined time window.

6. A computer implemented method for managing encoder instances in a serverless content distribution platform, the method comprising:
- receiving channel information relating to content to be streamed over a networked content distribution platform, the channel information including a start time for a content streaming event;
- associating the channel information with an encoder function that specifies video packaging settings and bitrates to create a stateless event object;
- repeating the receiving step and the associating step to create multiple stateless event objects, each event object corresponding to one or more channels of streaming content;
- combining the multiple stateless event objects into a state machine; monitoring the state of the state machine; and applying at least one workflow based on the states to manage instances of encoders corresponding to the one or more channels of streaming content; and
- calculating an optimal time to instantiate encoders for events based on at least one of the number of events scheduled to run in the predetermined time window, a preconfigured early start time for each event scheduled to run in the predetermined time window, and a predetermined time buffer configured to allow multiple attempts at starting the encoders.

7. The method of claim 6, wherein the event object comprises a data structure that includes fields for at least one of a channel ID, a connection state, content type, a start time, an end time, an event status, and a cryptographic key.

8. The method of claim 6, wherein the workflows include at least one of create channel workflow, an edit channel workflow, a delete channel workflow, and a restart channel workflow.

9. The method of claim 6, wherein the stateless event objects are AWS Lambda™ objects and the state machine is one or more AWS Step Functions™.

10. The method of claim 6, wherein the monitoring comprises periodically checking the status of the state machine to detect events that are scheduled to run in a predetermined time window.

11. A non-transient computer-readable storage medium having instructions embodied thereon, the instructions being executable by one or more processors to perform a method for managing encoder instances in a serverless content distribution platform, the method comprising:
- receiving channel information relating to content to be streamed over a networked content distribution platform, the channel information including a start time for a content streaming event;
- associating the channel information with an encoder function that specifies video packaging settings and bitrates to create a stateless event object;
- repeating the receiving step and the associating step to create multiple stateless event objects, each corresponding to one or more channels of streaming content;
- combining the multiple stateless event objects into a state machine;
- monitoring the state of the state machine; and
- applying at least one workflow based on the states to manage instances of encoders corresponding to the one or more channels of streaming content; and
- calculating an optimal time to instantiate encoders for events based on at least one of the number of events scheduled to run in the predetermined time window, a preconfigured early start time for each event scheduled to run in the predetermined time window, and a predetermined time buffer configured to avow multiple attempts at starting the encoders.

12. The computer-readable storage medium of claim 11, wherein the event object comprises a data structure that includes fields for at least one of a channel ID, a connection state, content type, a start time, an end time, an event status, and a cryptographic key.

13. The computer-readable storage medium of claim 11, wherein the workflows include at least one of create channel workflow, an edit channel workflow, a delete channel workflow, and a restart channel workflow.

14. The computer-readable storage medium of claim 11, wherein the stateless event objects are AWS Lambda™ objects and the state machine is one or more AWS Step Functions™.

15. The computer-readable storage medium of claim 11, wherein the monitoring comprises periodically checking the status of the state machine to detect events that are scheduled to run in a predetermined time window.

* * * * *